US008598791B2

(12) United States Patent
Liao

(10) Patent No.: US 8,598,791 B2
(45) Date of Patent: Dec. 3, 2013

(54) VEHICULAR LED LAMP

(76) Inventor: Yun-Chang Liao, Kaohsiung (TW)

( * ) Notice: Subject to any disclaimer, the term of this patent is extended or adjusted under 35 U.S.C. 154(b) by 0 days.

(21) Appl. No.: 13/616,200

(22) Filed: Sep. 14, 2012

(65) Prior Publication Data

US 2013/0010489 A1 Jan. 10, 2013

Related U.S. Application Data

(63) Continuation-in-part of application No. 13/090,302, filed on Apr. 20, 2011, now Pat. No. 8,525,415.

(51) Int. Cl.
*B60Q 1/00* (2006.01)
*B60Q 3/00* (2006.01)

(52) U.S. Cl.
USPC ............... 315/77; 315/82; 362/543; 362/294; 362/249.02; 362/218

(58) Field of Classification Search
USPC ................ 315/77, 82; 362/543, 294, 249.01, 362/249.02, 218, 240, 373, 249, 249.06, 362/249.14, 507, 545, 547, 800, 23.07, 612, 362/555
See application file for complete search history.

(56) References Cited

U.S. PATENT DOCUMENTS

| | | | | |
|---|---|---|---|---|
| 5,491,383 | A | 2/1996 | Leiber et al. | 315/77 |
| 5,923,027 | A | 7/1999 | Stam et al. | 250/208.1 |
| 6,417,624 | B1 | 7/2002 | Ito et al. | 315/88 |
| 7,244,036 | B2 | 7/2007 | Murakami et al. | 362/20 |
| 7,434,964 | B1 * | 10/2008 | Zheng et al. | 362/294 |
| 7,588,362 | B2 * | 9/2009 | Park et al. | 362/612 |
| 7,857,486 | B2 | 12/2010 | Long et al. | 362/294 |
| 2004/0080273 | A1 | 4/2004 | Ito et al. | 315/77 |
| 2007/0159828 | A1 * | 7/2007 | Wang | 362/294 |
| 2011/0112719 | A1 | 5/2011 | Marumoto et al. | 701/35 |

* cited by examiner

*Primary Examiner* — Daniel D Chang
(74) *Attorney, Agent, or Firm* — Alan Kamrath; Kamrath IP Lawfirm, P.A.

(57) ABSTRACT

A vehicular LED lamp includes a mounting seat and a plurality of LED light-emitting units mounted on the mounting seat. Each LED light-emitting unit includes a carrier plate having inner and outer surfaces, a circuit board engaged on the outer surface of the carrier plate, and at least one LED mounted on the circuit board and in contact with the outer surface of the carrier plate. The mounting seat includes a plurality of mounting grooves each having a bottom wall and two side walls with inclined sections. The LED light-emitting units are received in the mounting grooves of the mounting seat, with the inner surface of each carrier plate in contact with the bottom wall of an associated mounting groove, with two sides of each carrier plate abutting the inclined sections of the associated mounting groove.

8 Claims, 8 Drawing Sheets

VEHICULAR LED LAMP

CROSS REFERENCE TO RELATED APPLICATION

This is a continuation-in-part application of U.S. patent application Ser. No. 13/090,302 filed Apr. 20, 2011, now U.S. Pat. No. 8,525,415.

BACKGROUND OF THE INVENTION

The present invention relates to a vehicular LED (light-emitting diode) lamp and, more particularly, to an LED lamp for a vehicle, such as an automobile, which can quickly reduce the working temperature of the LEDs.

LEDs providing high-luminance are often utilized in vehicular lamps as a result of development of technology. However, the high working temperature of the LEDs causes light attenuation and accelerates deterioration of the chips, shortening the service life of the LEDs. Thus, illuminating devices using LEDs are generally mounted on a heat dissipating plate or the like to lower the working temperature of the LEDs by heat exchange with air currents. The service life of the LEDs can be prolonged if the working temperature can be quickly reduced through the heat dissipating plate.

Thus, a need exists for a vehicular LED lamp with novel heat dissipating provisions for effectively reducing the working temperature of LEDs.

BRIEF SUMMARY OF THE INVENTION

The present invention solves this need and other problems in the field of heat dissipation of vehicular LED lamps by providing a vehicular LED lamp including a mounting seat made of heat conductive material and having a front section. The front section of the mounting seat includes front and rear ends spaced from each other in a longitudinal direction. The front section further includes a plurality of mounting grooves spaced from each other in a circumferential direction about the longitudinal direction. Each mounting groove extends from the front end to the rear end of the front section in the longitudinal direction. Each mounting groove includes a rear wall on the rear end, a bottom wall extending from the rear wall to the front end of the front section in the longitudinal direction, two side walls extending outwardly from two sides of the bottom wall and spaced from each other in a width direction perpendicular to the longitudinal direction, and a groove opening opposite to the bottom wall and defined between the two side walls. Each side wall of each mounting groove includes an inner section extending perpendicularly from the bottom wall and an inclined section extending from the inner section toward the groove opening and at an obtuse angle to the inner section. The vehicular LED lamp further includes a plurality of carrier plates each received in one of the mounting grooves of the mounting seat and made of heat-conductive material. Each carrier plate includes outer and inner surfaces spaced from each other in a thickness direction perpendicular to the longitudinal and width directions. Each carrier plate carries at least one LED on the outer surface. Each carrier plate further includes two sides spaced from each other in the width direction and has a width in the width direction. The width of each carrier plate is slightly smaller than a width between the inner sections of the two side walls of an associated mounting groove in the width direction. The inner surface of each carrier plate is in contact with the bottom wall of the associated mounting groove, with the two sides of each carrier plate abutting the inclined sections of the two side walls of the associated mounting groove.

In a form shown, the vehicular LED lamp further includes a positioning member fixed to the front end of the mounting seat and abutting the second ends of the carrier plates. The positioning member includes a plurality of through-holes extending in the longitudinal direction. A screw extends through each through-hole and abuts against the second end of one of the carrier plates. An inclined face is formed on an outer side of the rear wall of each mounting groove and located adjacent to the groove opening and at an obtuse angle to the longitudinal direction. The first end of each carrier plate abuts the inclined face of the rear wall of the associated mounting groove. Each carrier plate includes first and second ends spaced from each other in the longitudinal direction, and each carrier plate has a length in the longitudinal direction approximately the same as a length of an associated mounting groove in the longitudinal direction. Each carrier plate has a thickness in the thickness direction slightly larger than a thickness of each inner section of the side walls to the bottom wall of the associated mounting groove in the thickness direction. The vehicular LED lamp further includes a heat pipe having an outer periphery. The mounting seat further includes a receptacle in the rear end of the front section, and at least a portion of the heat pipe is received in the receptacle, with the outer periphery of the heat pipe in contact with an inner periphery of the receptacle. The mounting seat further includes a rear section extending from the rear end of the front section in the longitudinal direction. A connector is engaged to the rear section of the mounting seat for electrical connection to a power supply of the vehicle. The vehicular LED lamp further includes a circuit board engaged on the outer surface of each carrier plate, and the at least one LED is mounted on the circuit board. A protrusion is formed on the outer surface of each carrier plate. The circuit board includes a slot receiving the protrusion of an associated carrier plate, with the at least one LED in contact with the protrusion of the outer surface of the associated carrier plate.

The present invention will become clearer in light of the following detailed description of illustrative embodiments of this invention described in connection with the drawings.

DESCRIPTION OF THE DRAWINGS

The illustrative embodiments may best be described by reference to the accompanying drawings where.

Figure 1:
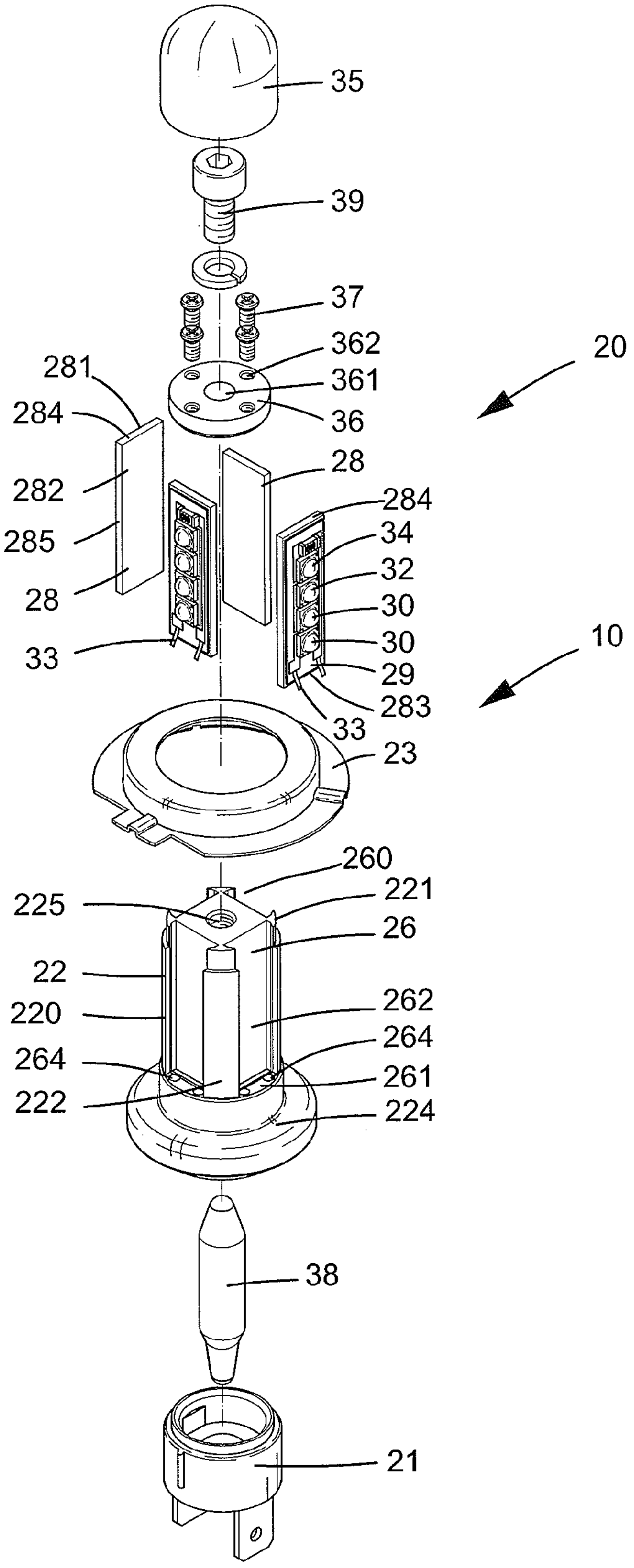
FIG. 1 shows an exploded, perspective view of a vehicular LED lamp of a first embodiment according to the present invention.
Figure 2:
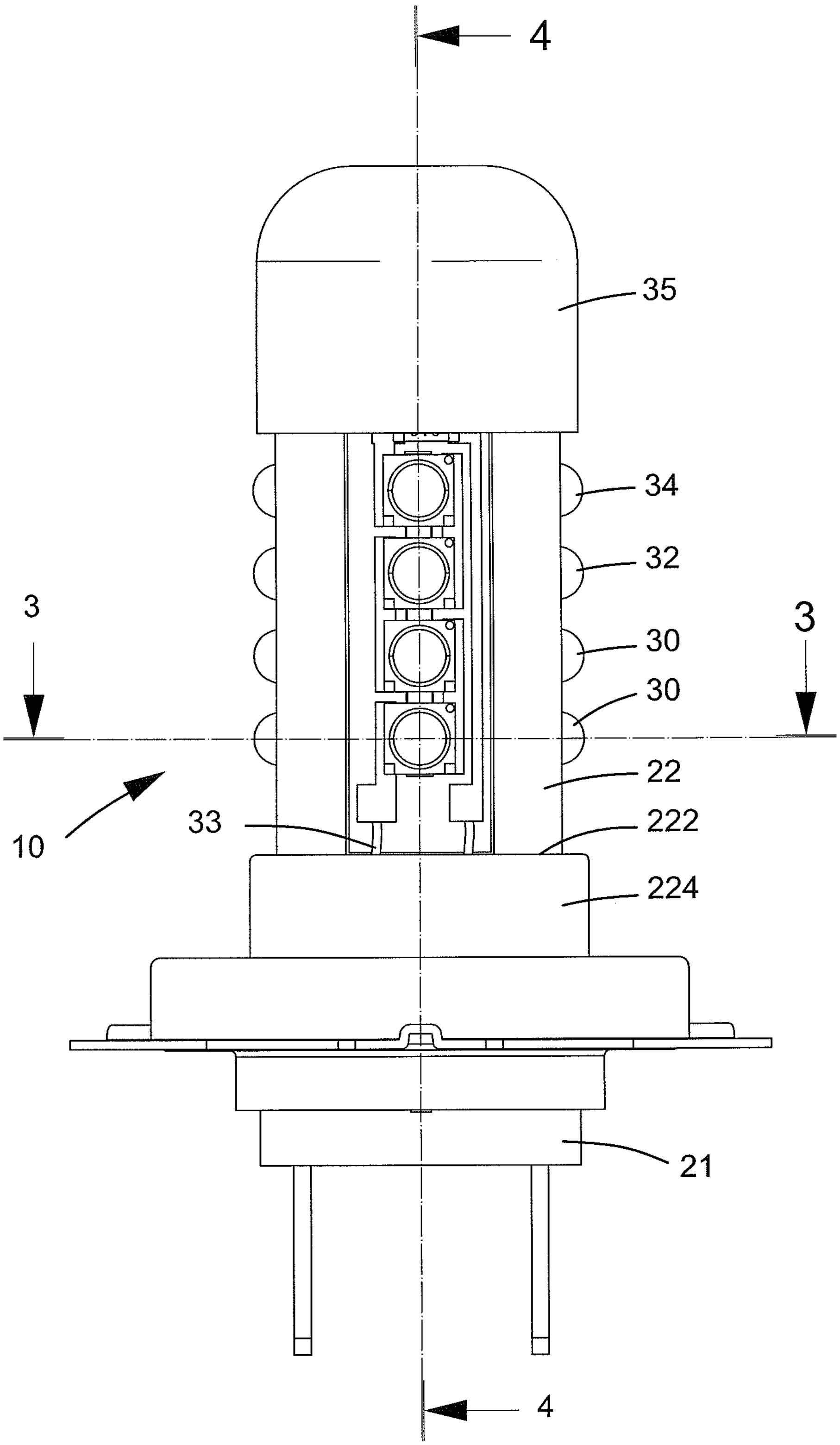
FIG. 2 shows a side view of the vehicular LED lamp of FIG. 1 after assembly.

All figures are drawn for ease of explanation of the basic teachings of the present invention only; the extensions of the figures with respect to number, position, relationship, and dimensions of the parts to form the preferred embodiments will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "first", "second", "third", "front", "rear", "inner", "outer", "end", and similar terms are used herein, it should be understood that these terms have reference only to the structure shown in the drawings as it would appear to a person viewing the drawings and are utilized only to facilitate describing the invention.

DETAILED DESCRIPTION OF THE INVENTION

Figure 3:
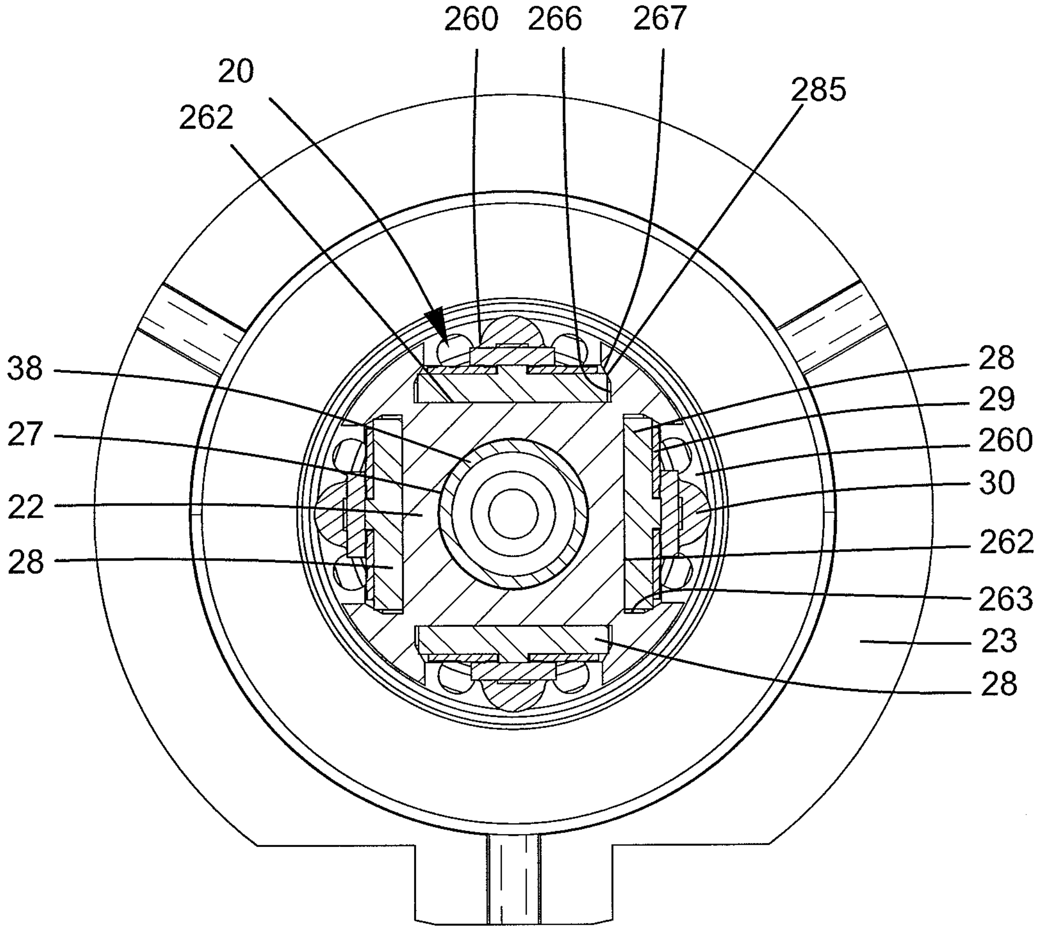
FIG. 3 is a sectional view according to section line 3-3 of FIG. 2.
Figure 4:
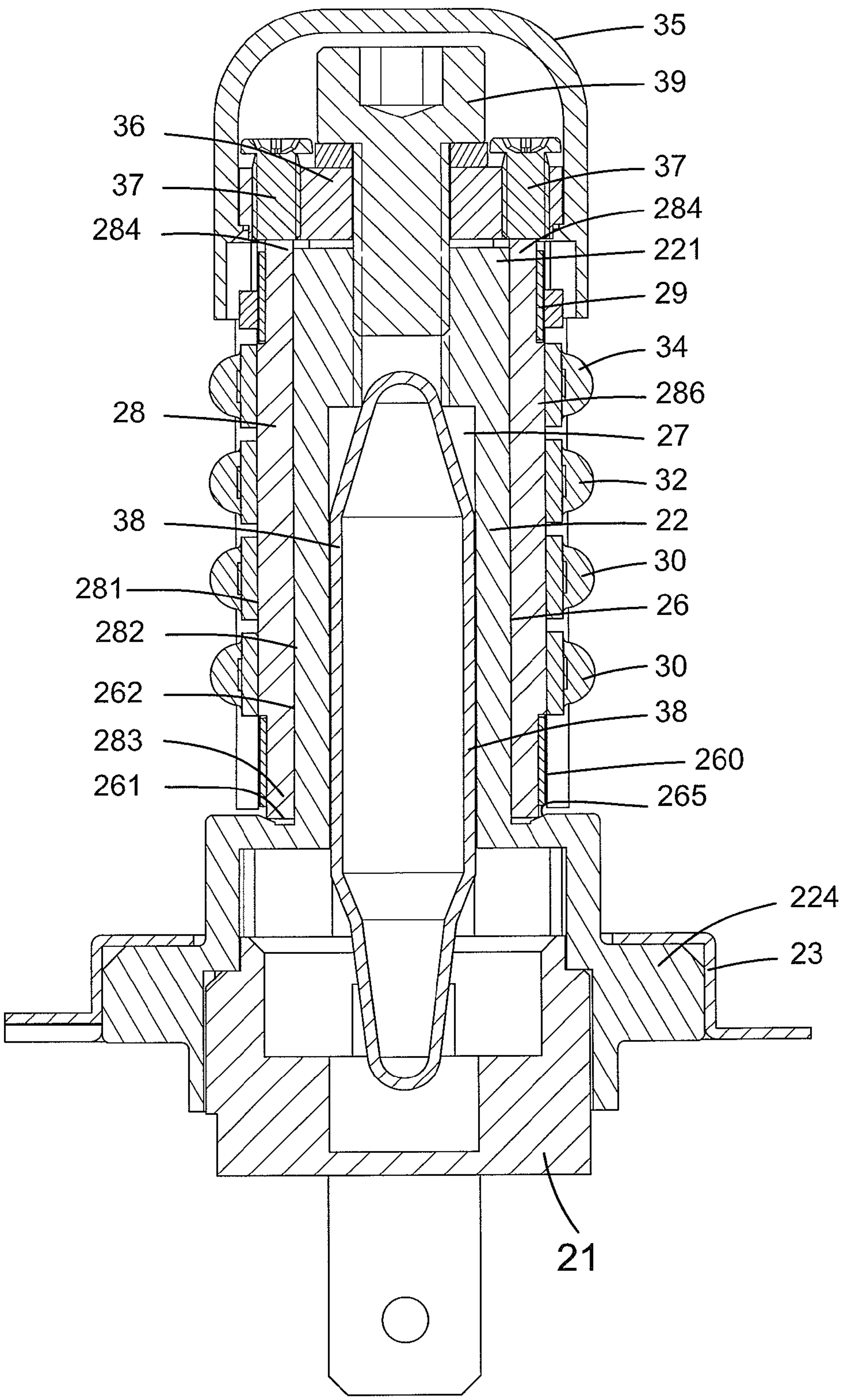
FIG. 4 is a sectional view according to section line 4-4 of FIG. 2.

A vehicular LED lamp 10 according to a first embodiment of the present invention is shown in FIGS. 1-6 of the drawings and can be utilized in a vehicle, such as an automobile, a motorcycle, or the like. Vehicular LED lamp 10 includes a mounting seat 22 and a plurality of LED light-emitting units 20 mounted on mounting seat 22. Mounting seat 22 is made of heat conductive material and includes a front section 220 having front and rear ends 221 and 222 spaced from each other in a longitudinal direction. Front section 220 of mounting seat 22 further includes a plurality of mounting grooves 26 each extending from front end 221 to rear end 222 in the longitudinal direction. In the form shown, front section 220 of mounting seat 22 includes four mounting grooves 26 angularly spaced from each other in a circumferential direction about the longitudinal direction. Each mounting groove 26 includes a rear wall 261 on rear end 222, a bottom wall 262 extending from rear wall 261 to front end 221 in the longitudinal direction, two side walls 263 extending outwardly from two sides of bottom wall 262, with side walls 263 spaced from each other in a width direction perpendicular to the longitudinal direction, and a groove opening 260 opposite to bottom wall 262 and defined between side walls 263 (see FIG. 3). In the form shown, an inclined face 265 is formed on an outer side of rear wall 261 of each mounting groove 26 adjacent to groove opening 260 and is at an obtuse angle to the longitudinal direction (FIG. 4). Each side wall 263 of each mounting groove 26 includes an inner section 266 extending perpendicularly from bottom wall 262 and an inclined section 267 extending from inner section 266 toward groove opening 260 and at an obtuse angle to inner section 266 (see FIG. 3). Furthermore, a threaded hole 225 is formed in an end face of front end 221 of mounting seat 22. A receptacle 27 is formed in rear end 222 of front section 220 of mounting seat 22

Mounting seat 22 further includes a rear section 224 extending from rear end 222 of front section 220 in the longitudinal direction and including a flange. A connector 21 is engaged to rear section 224 of mounting seat 22 for electrical connection to a power supply of the vehicle for providing the power required for operation of vehicular LED lamp 10. In the form shown, a mounting plate 23 is engaged on rear section 224 of mounting seat 22 for mounting to a lamp hole of the vehicle (not shown), allowing assembly of vehicular LED lamp 10 to the vehicle.

Figure 5:
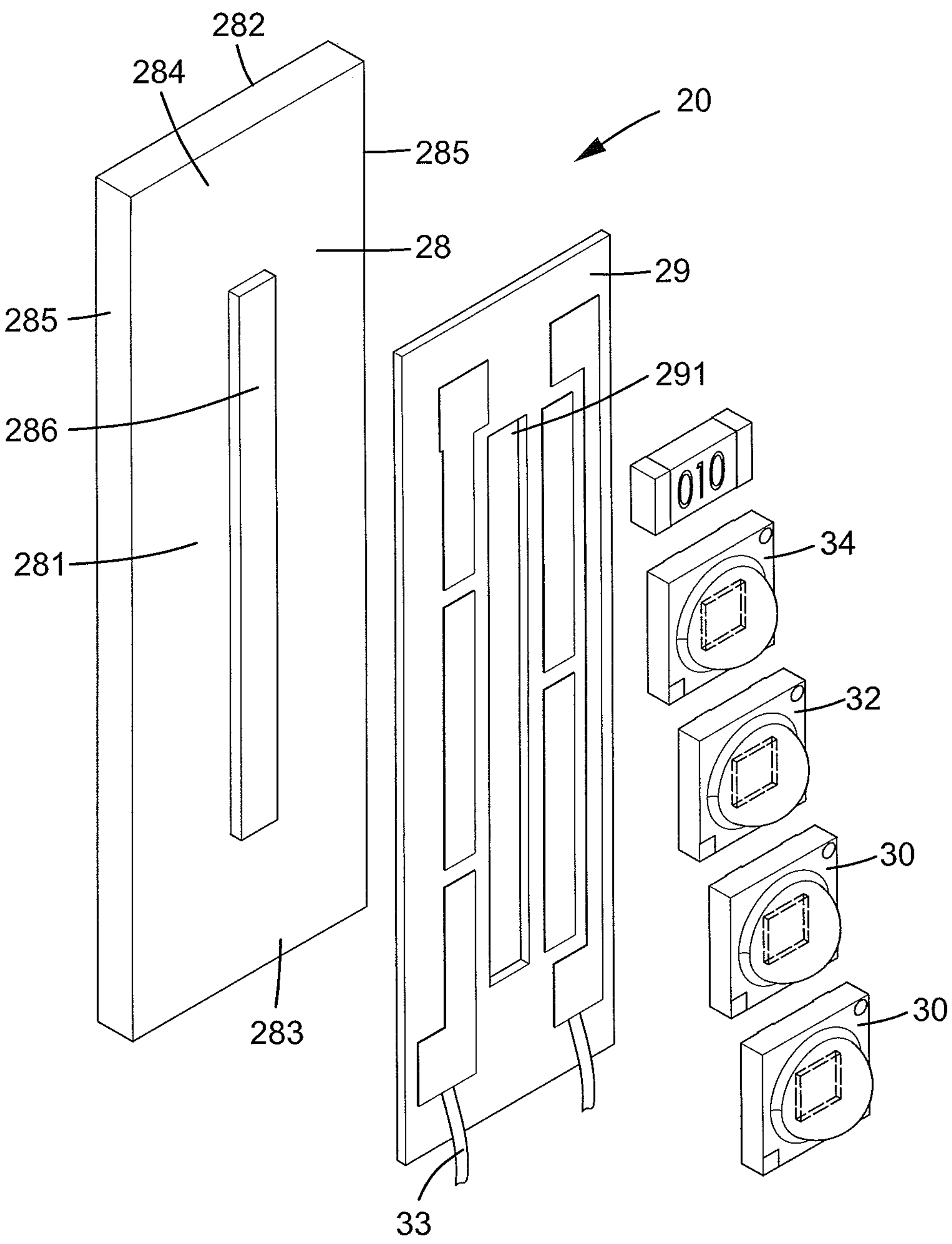
FIG. 5 shows an exploded, perspective view of an LED light-emitting unit of the vehicular LED lamp of FIG. 1.

In the form shown, vehicular LED lamp 10 includes four LED light-emitting units 20 each mounted in one of mounting grooves 26 of mounting seat 22. Each LED light-emitting unit 20 includes a carrier plate 28 received in one of mounting grooves 26 of mounting seat 22, a circuit board 29 engaged on carrier plate 28, and at least one LED mounted on circuit board 29. In the form shown, each carrier plate 28 is made of heat-conductive material and includes outer and inner surfaces 281 and 282 spaced from each other in a thickness direction perpendicular to the longitudinal and width directions. Each carrier plate 28 further includes first and second ends 283 and 284 spaced from each other in the longitudinal direction and has a length in the longitudinal direction approximately the same as that of an associated mounting groove 26 of mounting seat 22 in the longitudinal direction (FIG. 5). Each carrier plate 28 further includes two sides 285 spaced from each other in the width direction and has a width in the width direction which is slightly smaller than that between inner sections 266 of side walls 263 of an associated mounting groove 26 in the width direction (FIG. 3). Further, each carrier plate 28 has a thickness in the thickness direction which is slightly larger than a thickness of each inner section 266 of side walls 263 to bottom wall 262 of the associated mounting groove 26 in the thickness direction. When each carrier plate 28 is inserted from front end 221 of front section 220 of mounting seat 22 in the longitudinal direction and into an associated mounting groove 26, inner surface 282 of each carrier plate 28 is in contact with bottom wall 262 of the associated mounting groove 26, with first end 283 of each carrier plate 28 abutting inclined face 265 of rear wall 261 of the associated mounting groove 26, and with sides 285 of each carrier plate 28 abutting inclined sections 267 of side walls 263 of the associated mounting groove 26. Furthermore, an elongate protrusion 286 is formed on outer surface 281 of each carrier plate 28 and extends in the longitudinal direction.

Figure 6:
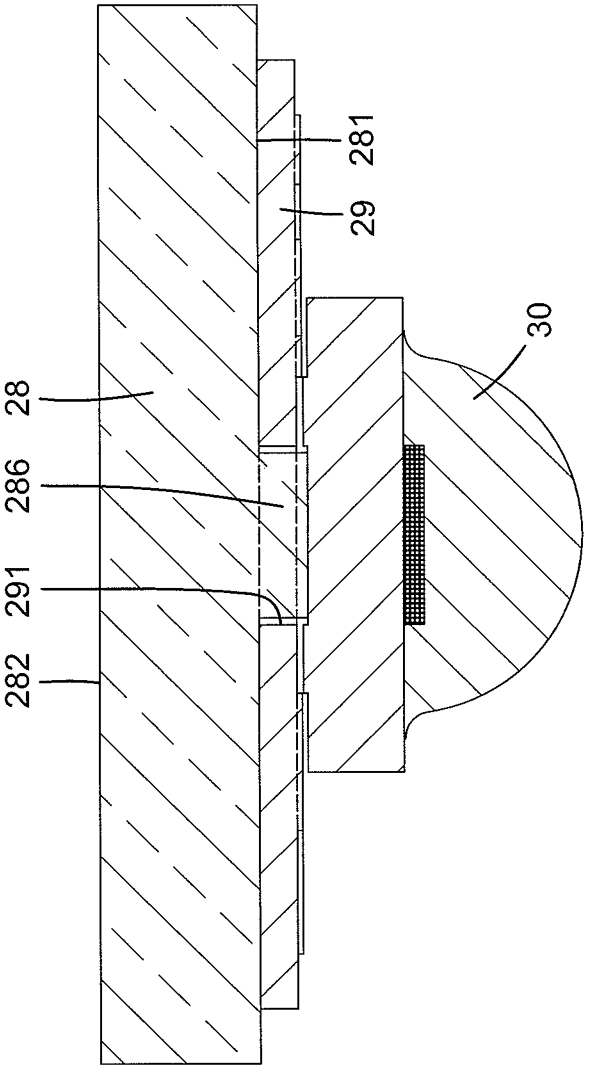
FIG. 6 shows a sectional view of the LED light-emitting unit of FIG. 5.

In the form shown, two first LEDs 30, a second LED 32, and a third LED 34 are mounted on each LED circuit board 29. Activation of first, second, and third LEDs 30, 32, and 34 can be separately controlled according to conditions and/or the environment surrounding the vehicle. For example, first and second LEDs 30 and 32 can be separately controlled by a selection/control unit (not shown) to emit white light beams, and second LED 32 is activated when first. LEDs 30 is in an abnormal function. Third LED 34 can emit yellow light beams or light beams of a color other than that of first and second LEDs 30 and 32 to provide better illumination while driving in a foggy or rainy condition. Each circuit board 29 includes an elongate slot 291 corresponding to protrusion 286 of one of carrier plates 28, and each circuit board 29 is engaged on outer surface 281 of the associated carrier plate 28, with slot 291 receiving an associated protrusion 286, such that first, second, and third LEDs 30, 32, and 34 on each LED circuit board 29 are in contact with outer surface 281 of an associated carrier plate 28 (FIG. 6). Furthermore, each circuit board 29 includes electric wires 33 which extend through wire holes 264 formed in rear wall 261 of each mounting groove 26.

Vehicular LED lamp 10 further includes a positioning member 36 mounted to front end 221 of mounting seat 22 for positioning carrier plates 28 in mounting grooves 26 of mounting seat 22. In the form shown, positioning member 36 includes a fixing hole 361 extending therethrough in the longitudinal direction. Positioning member 36 is fixed to front end 221 of mounting seat 22 and abuts second ends 284 of carrier plates 28 by a fastener 39 extending through fixing hole 361 into threaded hole 225 of mounting seat 22. Further, positioning member 36 includes a plurality of through-holes 362 extending therethrough in the longitudinal direction and distributed around fixing hole 361. A screw 37 extends through each through-hole 362 and abuts against second end 284 of one of carrier plates 28 (FIG. 4), allowing carrier plates

28 to be evenly and tightly pressed in mounting grooves 26. In a case that the lengths of carrier plates 28 are not equal to each other, screws 37 can be respectively adjusted to abut against second end 284 of respective carrier plates 28. Thus, inner surfaces 282 of carrier plates 28 can contact bottom walls 262 of mounting grooves 26. In the form shown, a cap 35 is mounted to front end 221 of mounting seat 22 for covering positioning member 36.

Vehicular LED lamp 10 further includes a heat pipe 38 with a heat transfer medium therein. In the form shown, a front portion of heat pipe 38 is received in receptacle 27 of mounting seat 22, with an outer periphery of heat pipe 38 in intimate contact with an inner periphery of receptacle 27.

Now that the basic construction of the vehicular LED lamp 10 has been explained, some of the advantages of the vehicular LED lamp 10 can be set forth and appreciated. In particular, by cooperation of protrusion 286 on outer surface 281 of each carrier plate 28 with slot 291 in each circuit board 29, first, second, and third LEDs 30, 32, and 34 are in direct contact with outer surfaces 281 of carrier plates 28, so that the heat generated by first, second, and third LEDs 30, 32, 34 can be directly transmitted to carrier plates 28 without heat transmission through circuit board 29. Thus, the working temperature of first, second, and third LEDs 30, 32, and 34 can be quickly reduced. Furthermore, by providing inclined section 267 on each side wall 263 of each mounting groove 26, inner surface 282 of each carrier plate 28 is in intimate contact with bottom wall 262 of the associated mounting groove 26, so that the heat of carrier plates 28 can be effectively transmitted to mounting seat 22. Further, since first end 283 of each carrier plate 28 adjacent to outer surface 281 abuts inclined face 265 on rear wall 261 of an associated mounting groove 26, inner surface 282 of each carrier plate 28 is apt to move toward bottom wall 262 of the associated mounting groove 26, further enhancing contact between carrier plates 28 and mounting seat 22.

Figure 7:
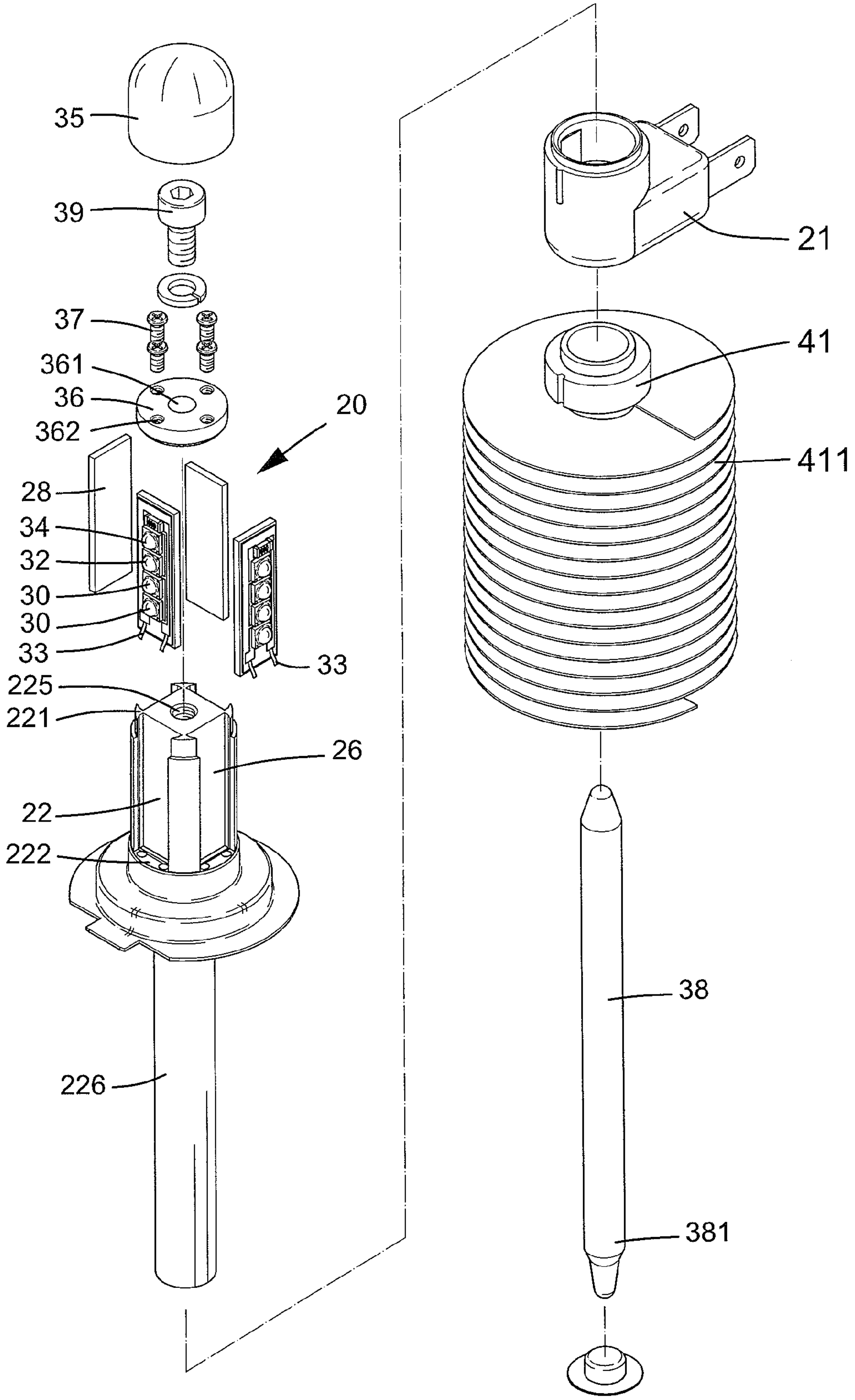
FIG. 7 shows an exploded, perspective view of a vehicular LED lamp of a second embodiment according to the present invention.
Figure 8:
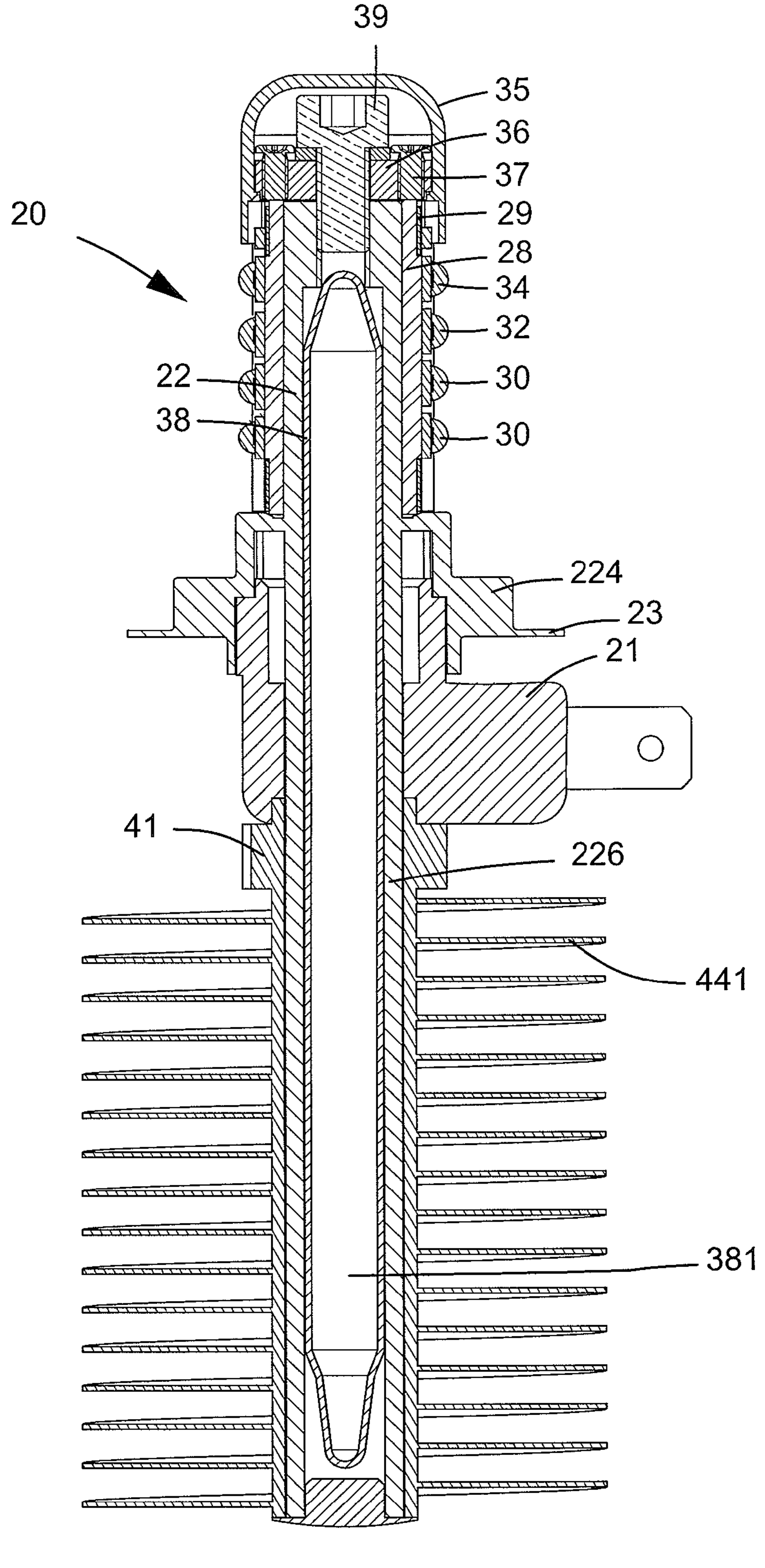
FIG. 8 shows a sectional view of the vehicular LED lamp of FIG. 7.

FIGS. 7 and 8 show another example of mounting seat 22 and heat pipe 38. In this embodiment, mounting seat 22 further includes a sleeve portion 226 extending outward from rear end 222 in the longitudinal direction and beyond rear section 224 of mounting seat 22. Heat pipe 38 includes an extension portion 381 received in sleeve portion 226. A heat dissipation member 41 is mounted around sleeve portion 226 and includes a plurality of fins 411 on an outer periphery thereof to increase the contact area between heat pipe 38 and the environment, enhancing the heat dissipating efficiency of first, second, and third LEDs 30, 32, and 34. In the embodiment, mounting plate 23 is integrally formed with rear section 224 of mounting seat 22.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

The invention claimed is:

1. A vehicular light emitting diode (LED) lamp comprising:

a mounting seat made of heat conductive material and including a front section, with the front section of the mounting seat including front and rear ends spaced from each other in a longitudinal direction, with the front section further including a plurality of mounting grooves spaced from each other in a circumferential direction about the longitudinal direction, with each of the plurality of mounting grooves extending from the front end to the rear end of the front section in the longitudinal direction, with each of the plurality of mounting grooves including a rear wall on the rear end, with each of the plurality of mounting grooves further including a bottom wall extending from the rear wall to the front end of the front section in the longitudinal direction, with each of the plurality of mounting grooves further including two side walls extending outwardly from two sides of the bottom wall and spaced from each other in a width direction perpendicular to the longitudinal direction, with each of the plurality of mounting grooves further including a groove opening opposite to the bottom wall and defined between the two side walls, with each of the two side walls of each of the plurality of mounting grooves including an inner section extending perpendicularly from the bottom wall, with each of the two side walls of each of the plurality of mounting grooves further including an inclined section extending from the inner section toward the groove opening and at an obtuse angle to the inner section;

a plurality of carrier plates, with each of the plurality of carrier plates received in one of the plurality of mounting grooves of the mounting seat and made of heat-conductive material, with each of the plurality of carrier plates including first and second ends spaced from each other in the longitudinal direction, with each of the plurality of carrier plates including outer and inner surfaces spaced from each other in a thickness direction perpendicular to the longitudinal and width directions, with each of the plurality of carrier plates carrying at least one LED on the outer surface, with each of the plurality of carrier plates further including two sides spaced from each other in the width direction and having a width in the width direction, with the width of each of the plurality of carrier plates being slightly smaller than a width between the inner sections of the two side walls of an associated one of the plurality of mounting grooves in the width direction, with the inner surface of each of the plurality of carrier plates in contact with the bottom wall of the associated mounting groove, with the two sides of each of the plurality of carrier plates abutting the inclined sections of the two side walls of the associated mounting groove; and a positioning member fixed to the front end of the mounting seat and abutting the second ends of the plurality of carrier plates, with the positioning member including a plurality of through-holes extending in the longitudinal direction, with a screw extending through each of the plurality of through-holes and abutting against the second end of one of the plurality of carrier plates.

2. A vehicular light emitting diode (LED) lamp comprising:

a mounting seat made of heat conductive material and including a front section, with the front section of the mounting seat including front and rear ends spaced from each other in a longitudinal direction, with the front section further including a plurality of mounting grooves spaced from each other in a circumferential direction about the longitudinal direction, with each of the plurality of mounting grooves extending from the front end to the rear end of the front section in the longitudinal direction, with each of the plurality of mounting grooves including a rear wall on the rear end, with each of the plurality of mounting grooves further including a bottom wall extending from the rear wall to the front end of the front section in the longitudinal direction, with each of the plurality of mounting grooves further including two side walls extending outwardly from two sides of the bottom wall and spaced from each other in a width direction perpendicular to the longitudinal direction, with each of the plurality of mounting grooves further including a groove opening opposite to the bottom wall and defined between the two side walls, with each of the two side walls of each of the plurality of mounting grooves including an inner section extending perpendicularly from the bottom wall, with each of the two side walls of each of the plurality of mounting grooves further including an inclined section extending from the inner section toward the groove opening and at an obtuse angle to the inner section;

a plurality of carrier plates, with each of the plurality of carrier plates received in one of the plurality of mounting grooves of the mounting seat and made of heat-conductive material, with each of the plurality of carrier plates including first and second ends spaced from each other in the longitudinal direction, with each of the plurality of carrier plates including outer and inner surfaces spaced from each other in a thickness direction perpendicular to the longitudinal and width directions, with each of the plurality of carrier plates carrying at least one LED on the outer surface, with each of the plurality of carrier plates further including two sides spaced from each other in the width direction and having a width in the width direction, with the width of each of the plurality of carrier plates being slightly smaller than a width between the inner sections of the two side walls of an associated one of the plurality of mounting grooves in the width direction, with the inner surface of each of the plurality of carrier plates in contact with the bottom wall of the associated mounting groove, with the two sides of each of the plurality of carrier plates abutting the inclined sections of the two side walls of the associated mounting groove; and a positioning member fixed to the front end of the mounting seat and abutting the second ends of the plurality of carrier plates, with an inclined face formed on an outer side of the rear wall of each of the plurality of mounting grooves and located adjacent to the groove opening and at an obtuse angle to the longitudinal direction, with the first end of each of the plurality of carrier plates abutting the inclined face of the rear wall of the associated mounting groove, with each of the plurality of carrier plates including first and second ends spaced from each other in the longitudinal direction, with each of the plurality of carrier plates having a length in the longitudinal direction approximately the same as a length of an associated one of the plurality of mounting grooves in the longitudinal direction, with each of the plurality of carrier plates having a thickness in the thickness direction slightly larger than a thickness of each of the inner sections of the two side walls to the bottom wall of the associated mounting groove in the thickness direction.

3. The vehicular LED lamp as claimed in claim 2, with the positioning member including a plurality of through-holes extending in the longitudinal direction, with a screw extending through each of the plurality of through-holes and abutting against the second end of one of the plurality of carrier plates.

4. The vehicular LED lamp as claimed in claim 2, further comprising:

a heat pipe including an outer periphery, with the mounting seat further including a receptacle in the rear end of the front section, with at least a portion of the heat pipe received in the receptacle, with the outer periphery of the heat pipe in contact with an inner periphery of the receptacle.

5. The vehicular LED lamp as claimed in claim 2, with the mounting seat further including a rear section extending from the rear end of the front section in the longitudinal direction, with a connector engaged to the rear section of the mounting seat for electrical connection to a power supply of the vehicle.

6. The vehicular LED lamp as claimed in claim 2, further comprising:

a circuit board engaged on the outer surface of each of the plurality of carrier plates, with the at least one LED mounted on the circuit board, with a protrusion formed on the outer surface of each of the plurality of carrier plates, with the circuit board including a slot receiving the protrusion of one of the plurality of carrier plates, with the at least one LED in contact with the protrusion of the outer surface of one of the plurality of carrier plates.

7. A light emitting diode (LED) light-emitting unit comprising:

a carrier plate made of heat-conductive material, with the carrier plate including outer and inner surfaces, with a protrusion formed on the outer surface;

a circuit board including a slot corresponding to the protrusion of the carrier plate, with the circuit board engaged on the outer surface of the carrier plate, with the slot receiving the protrusion; and at least one LED mounted on the circuit board and in contact with the protrusion of the outer surface of the carrier plate, with the circuit board located between the at least one LED and the carrier plate, and with the at least one LED extending across the slot of the circuit board.

8. The LED light-emitting unit as claimed in claim 7, with the carrier plate including first and second ends spaced from each other in a longitudinal direction, with the protrusion being an elongate protrusion and extending in the longitudinal direction, with the slot being an elongate slot and extending in the longitudinal direction, with the at least one LED including a plurality of LEDs spaced from each other in the longitudinal direction.

* * * * *